(12) United States Patent
Uesugi

(10) Patent No.: US 10,788,116 B2
(45) Date of Patent: Sep. 29, 2020

(54) AUTOMATIC TRANSMISSION AND METHOD OF MANUFACTURING AUTOMATIC TRANSMISSION

(71) Applicant: MAZDA MOTOR CORPORATION, Aki-gun, Hiroshima (JP)

(72) Inventor: Tatsuya Uesugi, Onomichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 275 days.

(21) Appl. No.: 16/073,962

(22) PCT Filed: Mar. 23, 2017

(86) PCT No.: PCT/JP2017/011598
§ 371 (c)(1),
(2) Date: Jul. 30, 2018

(87) PCT Pub. No.: WO2017/170082
PCT Pub. Date: Oct. 5, 2017

(65) Prior Publication Data
US 2019/0040948 A1    Feb. 7, 2019

(30) Foreign Application Priority Data

Mar. 29, 2016 (JP) .................. 2016-066372

(51) Int. Cl.
*F16H 57/02* (2012.01)
*B22F 3/105* (2006.01)
(Continued)

(52) U.S. Cl.
CPC ............. *F16H 57/02* (2013.01); *B22F 3/105* (2013.01); *B22F 3/16* (2013.01); *B33Y 10/00* (2014.12); *F16H 61/00* (2013.01); *F16H 61/0006* (2013.01); *F16H 61/0009* (2013.01); *F16H 61/0206* (2013.01); *F16H 61/143* (2013.01); *F16H 61/26* (2013.01);
(Continued)

(58) Field of Classification Search
CPC ....................... F16H 57/02; F16H 2057/02047
See application file for complete search history.

(56) References Cited

U.S. PATENT DOCUMENTS 7,055,405 B1 *  6/2006 Nitsche
7,131,929 B2 *  11/2006 Komer et al.
(Continued)

FOREIGN PATENT DOCUMENTS

CN    103890878 A    6/2014
JP    2011185363 A    9/2011

*Primary Examiner* — Erin D Bishop
(74) *Attorney, Agent, or Firm* — Alleman Hall Creasman & Tuttle LLP

(57) ABSTRACT

An automatic transmission according to one aspect of the present invention includes: a transmission mechanism including a rotational element; a valve body configured to control the transmission mechanism; an electronic control unit configured to perform electronic control of the valve body; and a transmission casing in which the transmission mechanism, the valve body, and the electronic control unit are arranged. The electronic control unit is formed such that an inner peripheral surface of the electronic control unit extends in a circumferential direction along an outer peripheral surface of the transmission mechanism.

14 Claims, 12 Drawing Sheets

(51) Int. Cl.
*F16H 61/26* (2006.01)
*B22F 3/16* (2006.01)
*B33Y 10/00* (2015.01)
*F16H 61/00* (2006.01)
*F16H 61/02* (2006.01)
*F16H 61/14* (2006.01)
*F16H 61/28* (2006.01)
*F16H 61/30* (2006.01)

(52) U.S. Cl.
CPC ......... *F16H 61/2807* (2013.01); *F16H 61/30* (2013.01); *F16H 2057/02047* (2013.01); *F16H 2061/308* (2013.01)

(56) References Cited

U.S. PATENT DOCUMENTS

2011/0232409 A1   9/2011   Sueshige et al.
2014/0239737 A1   8/2014   Reisch et al.

* cited by examiner

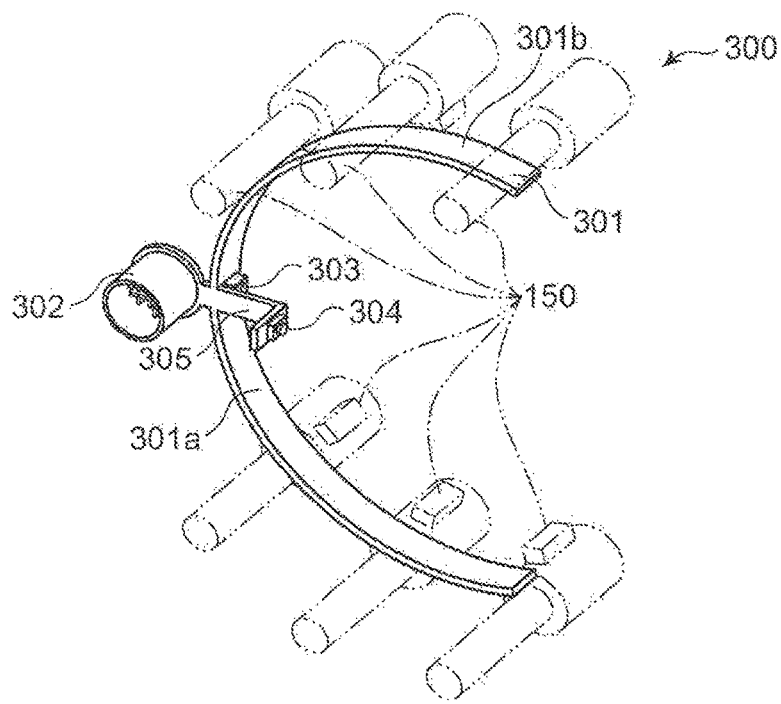
Fig. 13
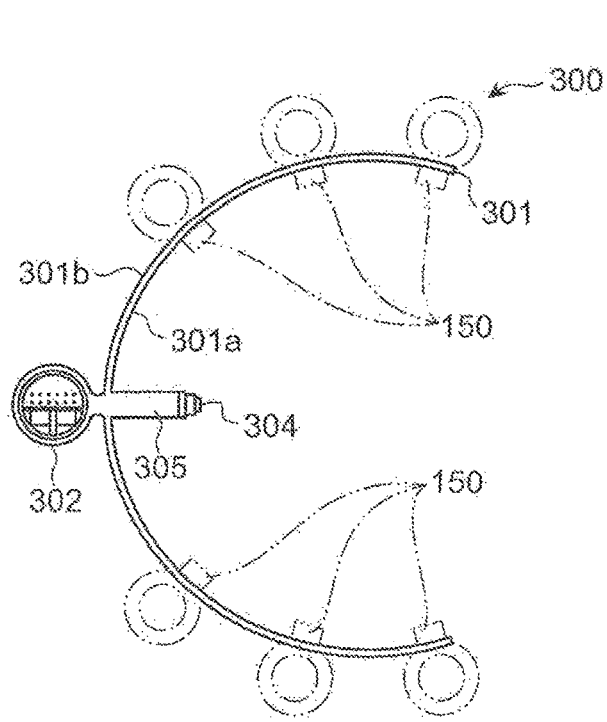 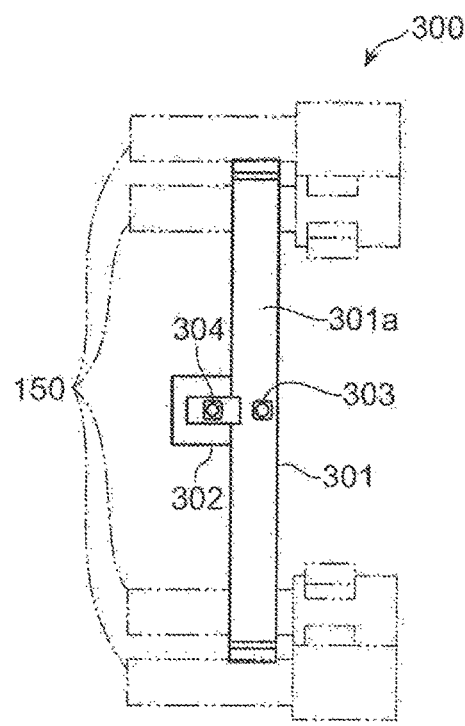
Fig. 14A　　　　　　　Fig. 14B

AUTOMATIC TRANSMISSION AND METHOD OF MANUFACTURING AUTOMATIC TRANSMISSION

TECHNICAL FIELD

The present invention relates to an automatic transmission for a vehicle, particularly to an automatic transmission including an electronic control unit and a method of manufacturing the automatic transmission.

BACKGROUND ART

Typically, an automatic transmission mounted on a vehicle includes a transmission mechanism, a hydraulic control mechanism, and an electronic control unit. The transmission mechanism includes hydraulic actuators (such as a clutch and a brake) and rotational elements (such as a gear). The hydraulic control mechanism controls, using a solenoid valve and the like, supply and discharge of hydraulic pressure to and from the hydraulic actuators, supply of lubricating oil to the rotational elements, and the like. The electronic control unit performs electronic control of the hydraulic control mechanism.

For example, PTL 1 discloses an automatic transmission configured such that an electronic control unit and sensor unit provided on an upper surface of a hydraulic control mechanism (valve body) are arranged under a transmission mechanism in a transmission casing together with the hydraulic control mechanism. The electronic control unit has a box-shaped outer shape. The electronic control unit receives a signal from, for example, a rotational frequency sensor included in the sensor unit and configured to detect a rotational speed of a rotational element of the transmission mechanism and outputs a control signal through a cable to a solenoid valve of the hydraulic control mechanism in accordance with, for example, a driving state of a vehicle.

CITATION LIST

Patent Literature

PTL 1: Japanese Laid-Open Patent Application Publication No. 2011-185363

SUMMARY OF INVENTION

Technical Problem

According to such conventional automatic transmissions, the transmission mechanism is constituted by a large number of rotational elements, and the entire shape of the automatic transmission is cylindrical. Therefore, when the box-shaped electronic control unit is provided at an outer side of the automatic transmission, the transmission casing expands at this portion. As a result, the entire automatic transmission tends to become large. Thus, there is still room for improvement regarding mountability of an automatic transmission onto a vehicle.

An object of the present invention is to downsize an automatic transmission including an electronic control unit.

Solution to Problem

To achieve the above object, an automatic transmission according to the present invention and a method of manufacturing an automatic transmission according to the present invention are configured as below.

A first aspect of the present invention is an automatic transmission including: a transmission mechanism including a rotational element; a hydraulic control mechanism configured to control the transmission mechanism; an electronic control unit configured to perform electronic control of the hydraulic control mechanism; and a transmission casing in which the transmission mechanism, the hydraulic control mechanism, and the electronic control unit are arranged, wherein the electronic control unit is formed such that an inner peripheral surface of the electronic control unit extends in a circumferential direction along an outer peripheral surface of the transmission mechanism.

A second aspect of the present invention is configured such that in the first aspect of the present invention, the hydraulic control mechanism is formed such that an inner peripheral surface of the hydraulic control mechanism extends in the circumferential direction along the outer peripheral surface of the transmission mechanism.

A third aspect of the present invention is configured such that in the second aspect of the present invention, a plurality of hydraulic solenoid valves are provided at one axial end of the hydraulic control mechanism so as to be lined up in the circumferential direction, and the electronic control unit is arranged adjacent to the hydraulic solenoid valves.

A fourth aspect of the present invention is configured such that in the second or third aspect of the present invention, the hydraulic control mechanism is formed integrally with the transmission casing.

A fifth aspect of the present invention is configured such that in the first to fourth aspects of the present invention, a rotational frequency detecting portion configured to detect a rotational frequency of the rotational element is formed integrally with the electronic control unit.

A sixth aspect of the present invention is configured such that in the fifth aspect of the present invention, the transmission casing includes an intermediate wall, and the electronic control unit is arranged in an accommodating space located at a first axial side of the intermediate wall.

A seventh aspect of the present invention is configured such that in the sixth aspect of the present invention, an input clutch of the transmission mechanism is arranged in the accommodating space, and the rotational frequency detecting portion includes a sensor configured to detect a rotational frequency of an input-side rotational element of the input clutch.

An eighth aspect of the present invention is configured such that in the sixth or seventh aspect of the present invention, the rotational element includes an output member supported by the intermediate wall, and the rotational frequency detecting portion includes a sensor configured to detect a rotational frequency of the output member.

A ninth aspect of the present invention is a method of manufacturing an automatic transmission, the automatic transmission including: a transmission mechanism including a rotational element; a hydraulic control mechanism configured to control the transmission mechanism; an electronic control unit configured to perform electronic control of the hydraulic control mechanism; and a transmission casing in which the transmission mechanism, the hydraulic control mechanism, and the electronic control unit are arranged, wherein the electronic control unit is formed such that an inner peripheral surface of the electronic control unit extends in a circumferential direction along an outer peripheral surface of the transmission mechanism, the method including molding the hydraulic control mechanism by a three-dimensional lamination molding method such that an inner peripheral surface of the hydraulic control mechanism extends in the circumferential direction along the outer peripheral surface of the transmission mechanism.

Advantageous Effects of Invention

According to the automatic transmission of the first aspect of the present invention, the electronic control unit is formed such that the inner peripheral surface of the electronic control unit extends in the circumferential direction along the outer peripheral surface of the transmission mechanism. Therefore, as compared to the conventional automatic transmission in which the electronic control unit having a box-shaped outer shape is arranged outside the transmission mechanism having a cylindrical outer shape, the entire automatic transmission can be compactly configured in a radial direction, and with this, mountability of the automatic transmission onto a vehicle improves.

According to the second aspect of the present invention, the hydraulic control mechanism is configured such that the inner peripheral surface of the hydraulic control mechanism extends in the circumferential direction along the outer peripheral surface of the transmission mechanism. Therefore, as compared to the conventional automatic transmission in which the hydraulic control mechanism and the electronic control unit each having a box-shaped outer shape are arranged outside the transmission mechanism having a cylindrical outer shape, the entire automatic transmission can be compactly configured in the radial direction, and with this, the mountability of the automatic transmission onto the vehicle further improves.

According to the third aspect of the present invention, the plurality of hydraulic solenoid valves are provided at one axial end of the hydraulic control mechanism so as to be lined up in the circumferential direction, and the electronic control unit is arranged adjacent to the hydraulic solenoid valves. Therefore, the plurality of solenoid valves can be easily connected to the electronic control unit without through a cable.

According to the fourth aspect of the present invention, the hydraulic control mechanism is formed integrally with the transmission casing. Therefore, as compared to a case where these are individually formed by using separate members, the number of parts and the number of steps of assembly can be reduced.

According to the fifth aspect of the present invention, the rotational frequency detecting portion configured to detect the rotational frequency of the rotational element is formed integrally with the electronic control unit. Therefore, as compared to the conventional automatic transmission in which the rotational frequency detecting portion is formed separately from the electronic control unit, the electronic control unit including the rotational frequency detecting portion can be easily attached in the transmission casing.

According to the sixth aspect of the present invention, the electronic control unit is arranged in the accommodating space located at the first axial side of the intermediate wall in the transmission casing. Therefore, the electronic control unit can be accommodated while effectively utilizing the space in the transmission casing.

According to the seventh aspect of the present invention, the sensor configured to detect the rotational frequency of the input-side rotational element of the input clutch arranged in the accommodating space located at the first axial side of the intermediate wall is included as the rotational frequency detecting portion. Therefore, as compared to the conventional automatic transmission in which the sensor configured to detect the rotational frequency of the input-side rotational element is formed separately from the electronic control unit, the electronic control unit including the sensor can be easily attached in the transmission casing.

According to the eighth aspect of the present invention, the sensor configured to detect the rotational frequency of the output member supported by the intermediate wall is included as the rotational frequency detecting portion. Therefore, as compared to the conventional automatic transmission in which the sensor configured to detect the rotational frequency of the output member is formed separately from the electronic control unit, the electronic control unit including the sensor can be easily attached in the transmission casing.

According to the method of manufacturing the automatic transmission of the ninth aspect of the present invention, the hydraulic control mechanism including the inner peripheral surface extending in the circumferential direction along the outer peripheral surface of the transmission mechanism can be manufactured by the three-dimensional lamination molding method. Therefore, as compared to the conventional automatic transmission in which the electronic control unit and the hydraulic control mechanism each having a box-shaped outer shape are arranged outside the transmission mechanism having a cylindrical outer shape, the entire automatic transmission to which the hydraulic control mechanism is assembled can be configured compactly in the radial direction, and as a result, the mountability of the automatic transmission onto the vehicle improves.

Further, since the hydraulic control mechanism is molded by the three-dimensional lamination molding method, it is unnecessary to consider separating the hydraulic control mechanism from a die. Therefore, when designing oil passages of the hydraulic control mechanism, there is no conventional restriction, such as a restriction in which all the oil passages need to be open on a contact surface over the entire length. Therefore, a high degree of freedom of the shapes and layout of the oil passages can be obtained, and with this, the degree of freedom of the shape of the hydraulic control mechanism and the degree of freedom of the layout in the transmission casing are also made high.

BRIEF DESCRIPTION OF DRAWINGS

FIG. 13 is a perspective view showing only the electronic control unit of the automatic transmission.

FIG. 14A is a plan view showing only the electronic control unit, and FIG. 14B is a side view showing only the electronic control unit.

DESCRIPTION OF EMBODIMENTS

Hereinafter, the configuration of an automatic transmission according to the present invention will be explained in respective embodiments with reference to the attached drawings.

Embodiment 1

First, an automatic transmission 1 according to Embodiment 1 of the present invention will be explained with reference to FIGS. 1 to 7.

Figure 1:
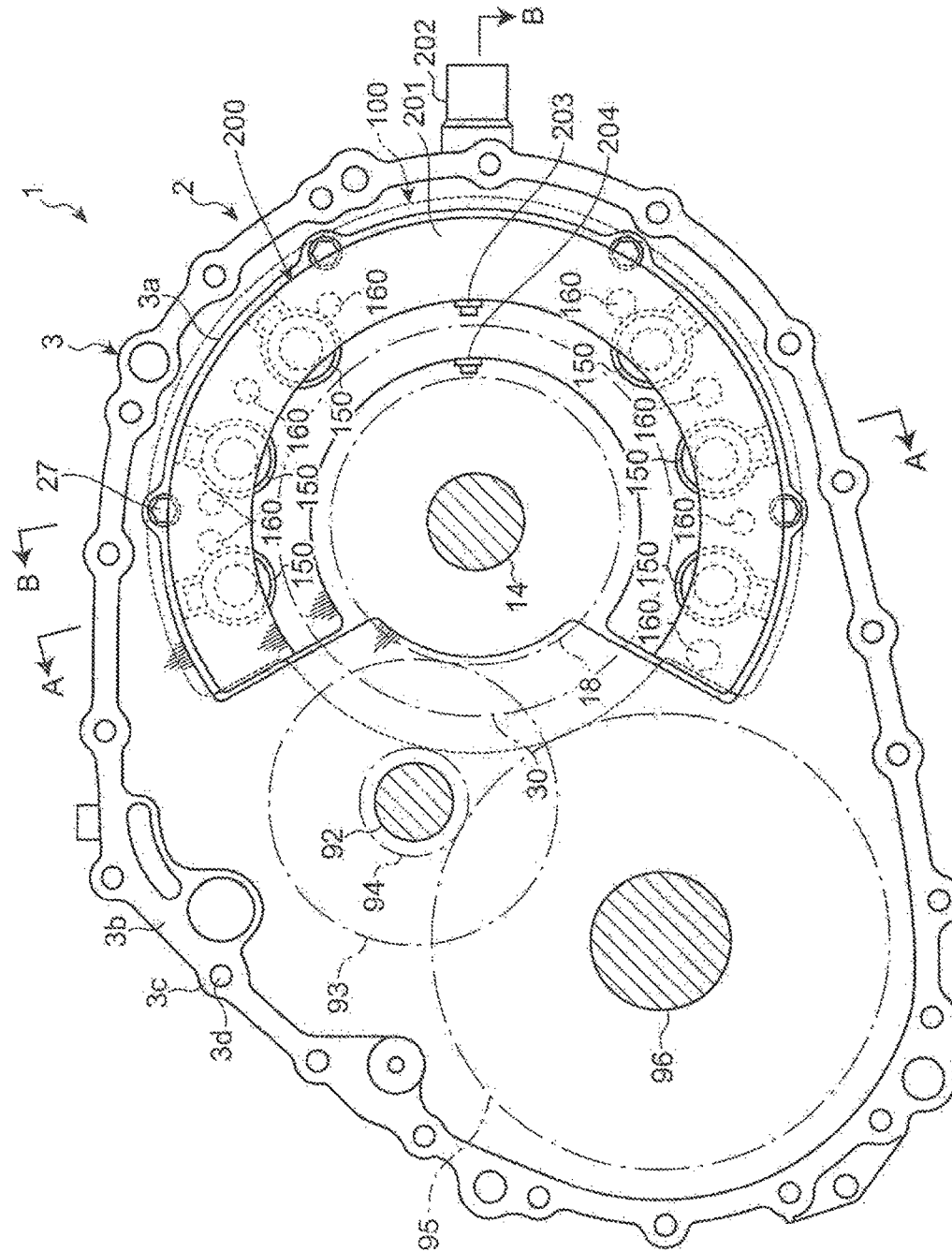
FIG. 1 is a diagram when viewing a schematic internal structure of an automatic transmission according to Embodiment 1 of the present invention from a driving source side in an axial direction.
Figure 2:
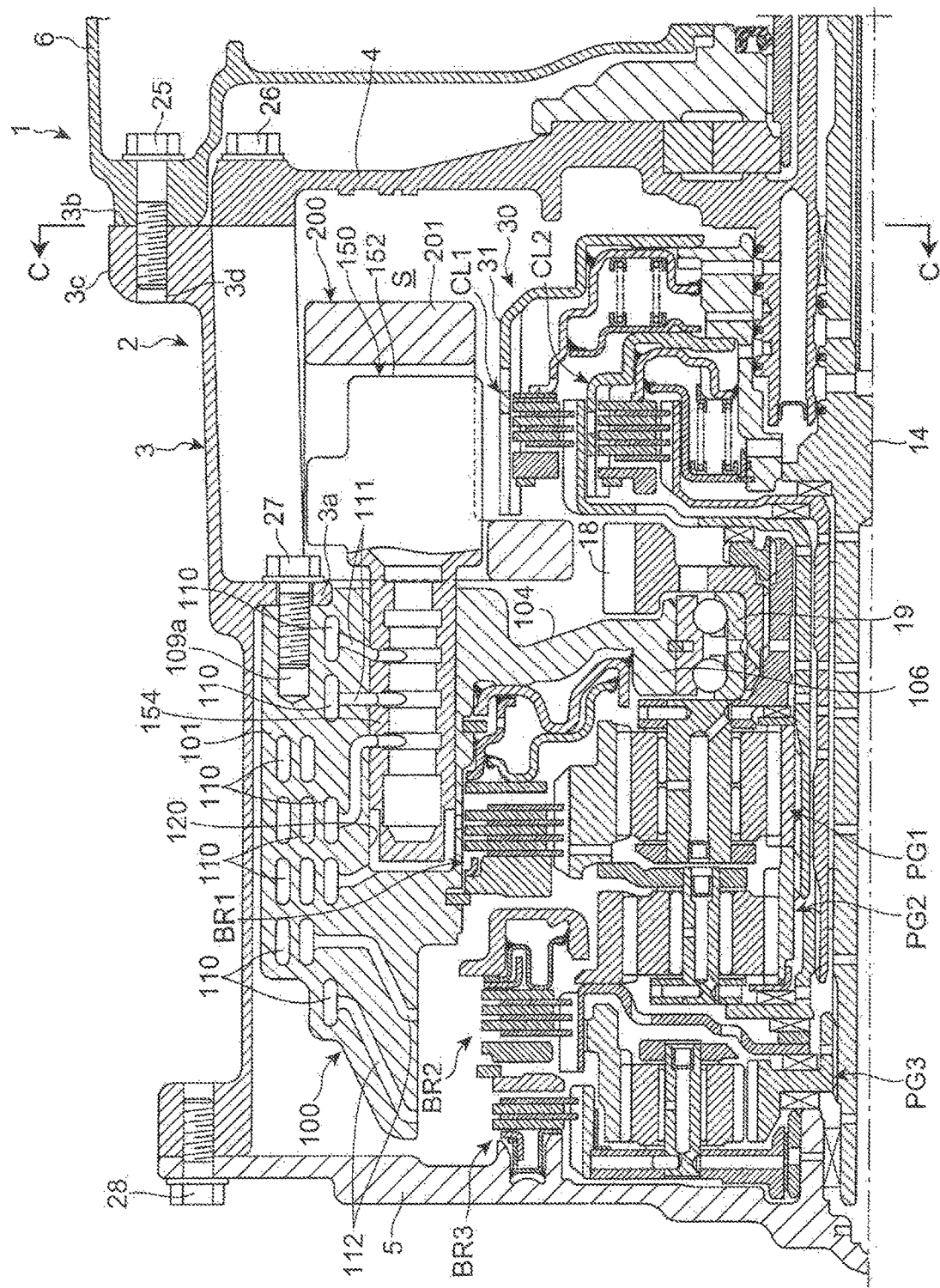
FIG. 2 is a sectional view taken along line A-A of FIG. 1 and shows an upper-half portion of the internal structure of the automatic transmission.
Figure 3:
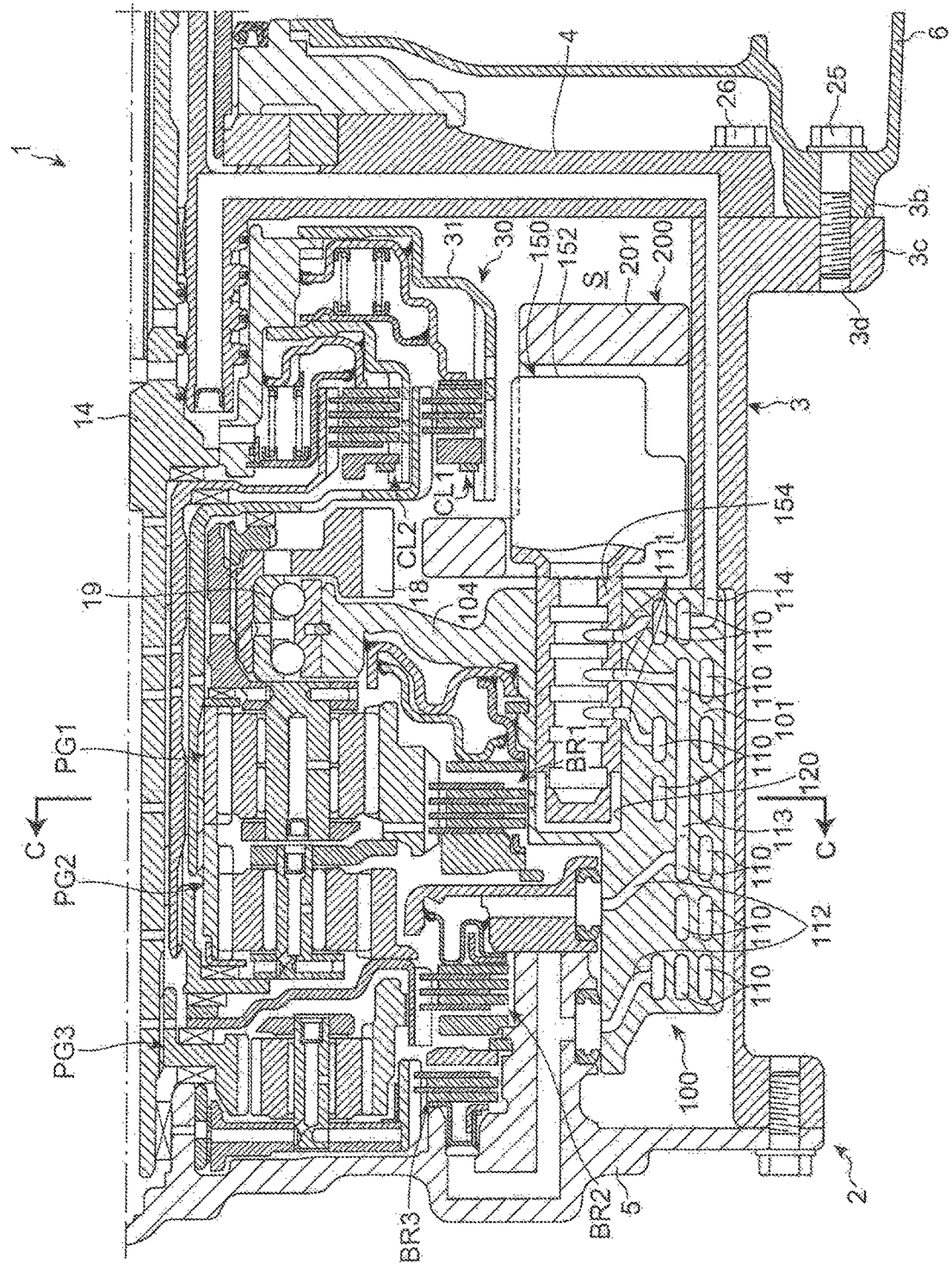
FIG. 3 is a sectional view taken along line A-A of FIG. 1 and shows a lower-half portion of the internal structure of the automatic transmission.
Figure 4:
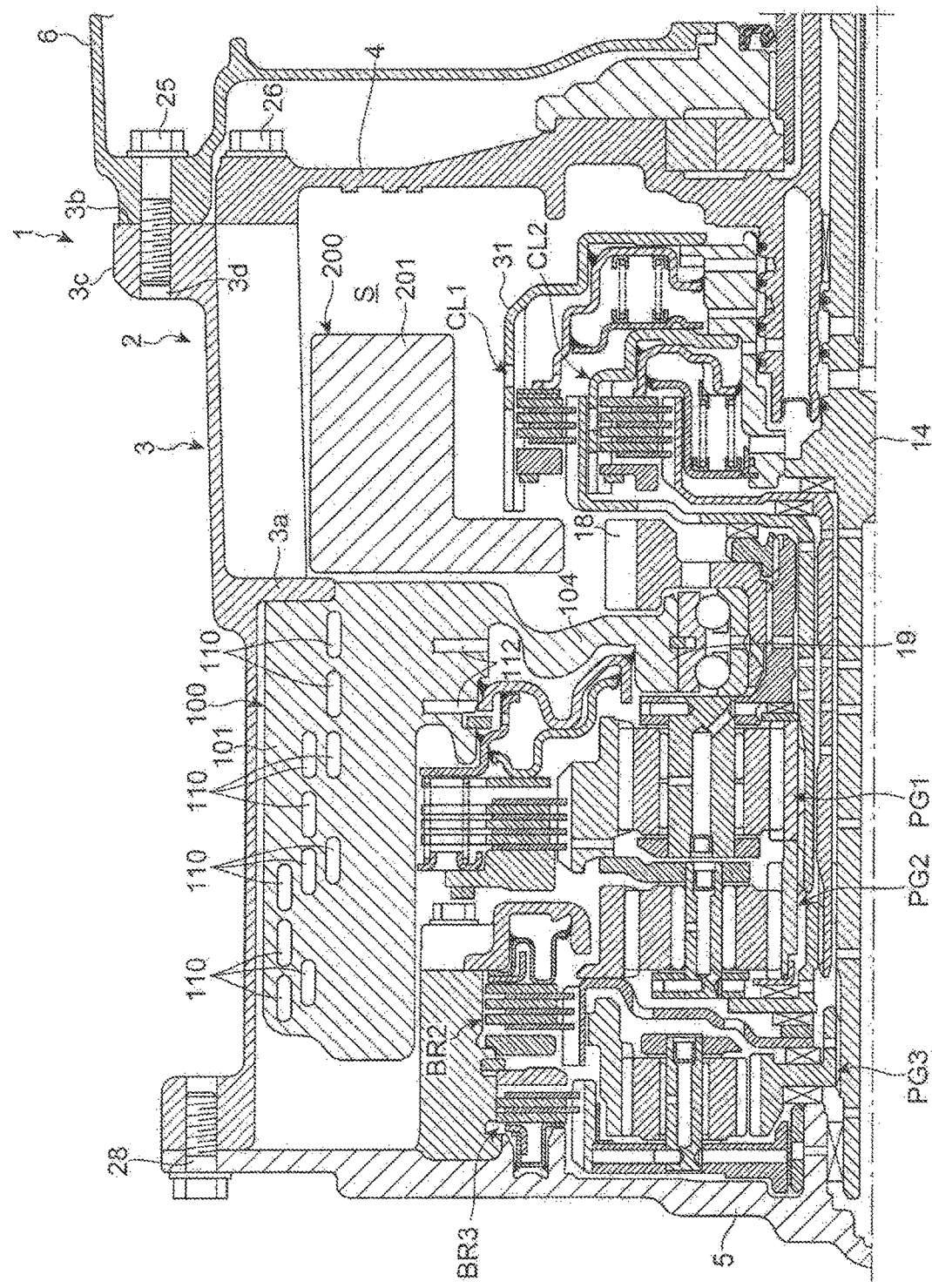
FIG. 4 is a sectional view taken along line B-B of FIG. 1 and shows the upper-half portion of the internal structure of the automatic transmission.
Figure 5:
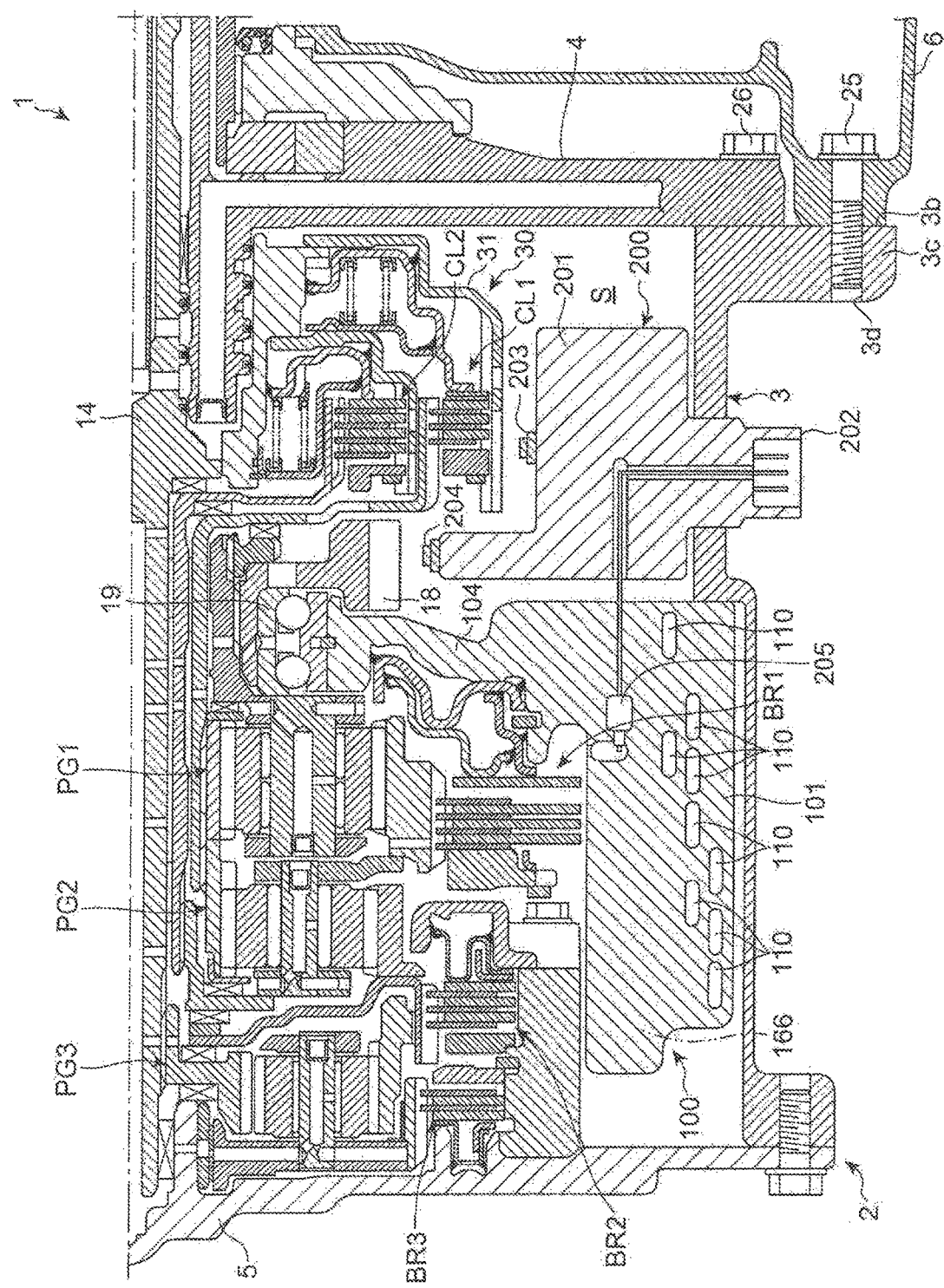
FIG. 5 is a sectional view taken along line B-B of FIG. 1 and shows the lower-half portion of the internal structure of the automatic transmission.
Figure 6:
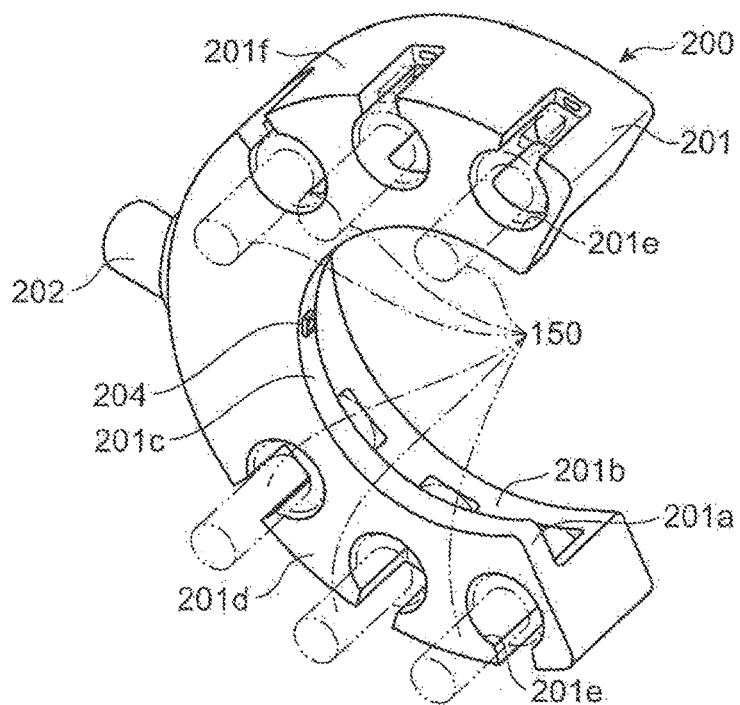
FIG. 6 is a perspective view showing only an electronic control unit of the automatic transmission.
Figure 7A:
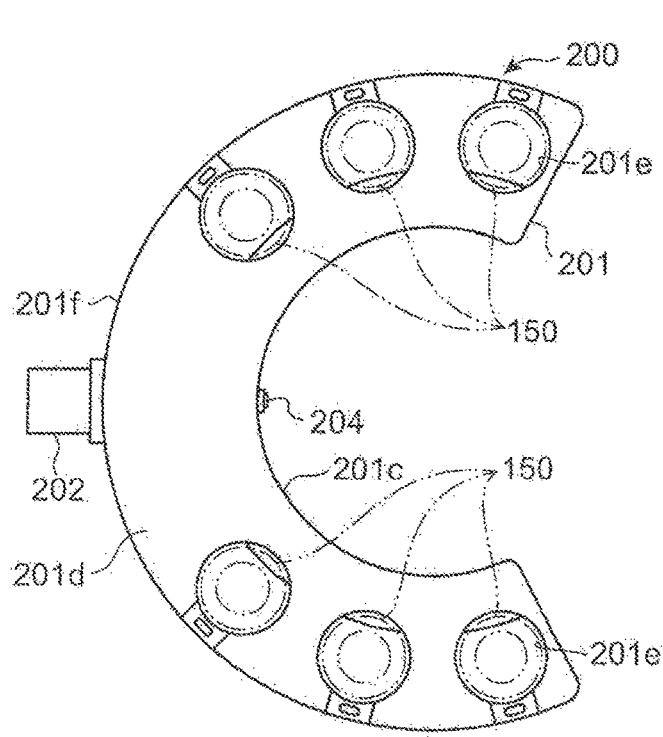
FIG. 7A is a plan view showing only the electronic control unit.
Figure 7B:
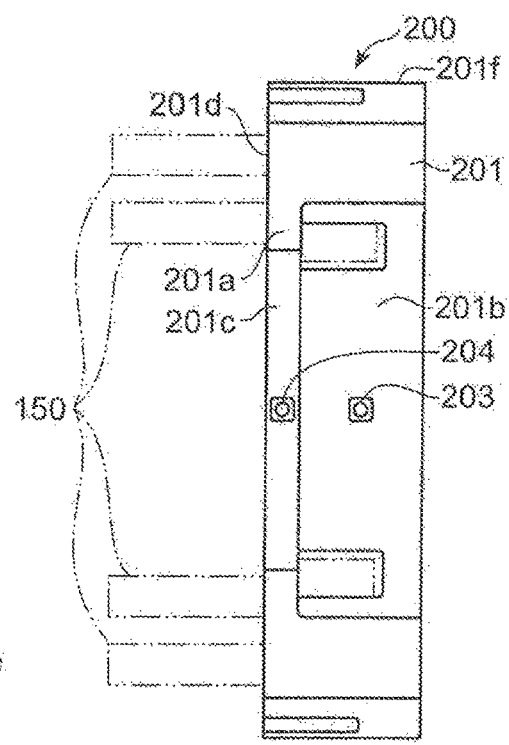
FIG. 7B is a side view showing only the electronic control unit.

FIG. 1 is a diagram when viewing a schematic internal structure of the automatic transmission 1 according to Embodiment 1 from a driving source side in an axial direction. Each of FIGS. 2 and 3 is a sectional view taken along line A-A of FIG. 1 and shows the internal structure of the automatic transmission 1. Each of FIGS. 4 and 5 is a sectional view taken along line B-B of FIG. 1 and shows the internal structure of the automatic transmission 1. FIG. 6 is a perspective view showing only an electronic control unit of the automatic transmission. FIG. 7A is a plan view showing only the electronic control unit, and FIG. 7B is a side view showing only the electronic control unit.

Entire Configuration of Automatic Transmission

As shown in FIGS. 1 to 5, the automatic transmission 1 includes a transmission mechanism 30, a valve body 100, and an electronic control unit 200 in a transmission casing 2. The transmission mechanism 30 includes a rotational element. The valve body 100 controls the transmission mechanism 30. The electronic control unit 200 performs electronic control of the valve body 100.

The automatic transmission 1 is applied to a transverse engine equipped automobile, such as a front engine-front drive vehicle. The transmission mechanism 30 is arranged on a center axis extending in a vehicle body width direction.

Although not shown, a torque converter and a driving source (such as an engine) are arranged at, for example, a right side of the transmission mechanism 30 in the vehicle body width direction. Hereinafter, for convenience of explanation, regarding the vehicle body width direction (direction along a center axis of the transmission mechanism 30), the driving source side (corresponding to a right side in FIGS. 2 to 5 and also to "a first axial side" mentioned in "Solution to Problem") is defined as a front side, and an anti-driving source side (corresponding to a left side in FIGS. 2 to 5 and also to "a second axial side") is defined as a rear side.

As shown in FIGS. 2 to 5, the transmission mechanism 30 includes: an input shaft 14 extending along the center axis of the transmission mechanism 30; and a counter drive gear 18 serving as an output portion and arranged on the same axis as the input shaft 14.

For example, the input shaft 14 of the transmission mechanism 30 is formed integrally with a turbine shaft serving as an output portion of the torque converter and is coupled to the driving source through the torque converter. With this, an output rotation of the torque converter is input to the transmission mechanism 30 through the input shaft 14.

As shown in FIG. 1, the automatic transmission 1 further includes a counter shaft 92 at which a counter driven gear 93 meshing with the counter drive gear 18 is provided. The counter shaft 92 is located at a vehicle body rear side of the input shaft 14 and is arranged parallel to the input shaft 14. A final drive gear 94 smaller in diameter than the counter driven gear 93 is further provided at the counter shaft 92.

Axles 96 are arranged at a vehicle body rear side and obliquely lower side of the counter shaft 92. The final drive gear 94 meshes with a differential ring gear 95 of a differential device (not shown) arranged on the same axis as the axles 96. The differential ring gear 95 is larger in diameter than the final drive gear 94. With this, the output rotation of the transmission mechanism 30 is decelerated and then transmitted to the differential device, and the power input to the differential device is transmitted to the left and right axles 96 such that a rotation difference between the axles 96 corresponds to a traveling state.

Transmission Casing

As shown in FIGS. 2 to 5, the transmission casing 2 includes a casing main body 3, an oil pump housing 4, and an end cover 5. The casing main body 3 constitutes an outer periphery of the transmission casing 2. The oil pump housing 4 is attached to a front-side end portion of the casing main body 3. The end cover 5 closes a rear-side opening end portion of the casing main body 3.

The casing main body 3 is formed in a substantially tubular shape as a whole and is arranged so as to surround the transmission mechanism 30. The casing main body 3 includes a wall portion 3a projecting from an inner peripheral surface of the casing main body 3 inward in a radial direction. The wall portion 3a is arranged at the rear side of a first clutch CL1 and a second clutch CL2 in the axial direction. The wall portion 3a is arranged along a plane perpendicular to the axial direction.

A contact surface 3b with which a converter housing 6 accommodating the torque converter contacts is provided at a front-side opening end portion of the casing main body 3. A plurality of seat portions 3c at each of which a bolt hole 3d is formed are formed on the contact surface 3b at intervals in a circumferential direction. The casing main body 3 and the converter housing 6 are coupled to each other by bolts 25 screwed into the bolt holes 3d.

The oil pump housing 4 is arranged so as to separate an accommodating space formed by the converter housing 6 and accommodating the torque converter and an accommodating space formed by the casing main body 3 and accommodating the transmission mechanism 30. An outer peripheral end portion of the oil pump housing 4 is fixed to a front-side end portion of the casing main body 3 by, for example, bolts 26. A mechanical oil pump is accommodated at the front side of the oil pump housing 4.

The end cover 5 is coupled to a rear-side end portion of the casing main body 3 by, for example, bolts 28.

Transmission Mechanism

As shown in FIGS. 2 to 5, the automatic transmission 1 of the present embodiment is a stepped transmission. The transmission mechanism 30 includes first, second, and third planetary gear sets (hereinafter simply referred to as "gear sets") PG1, PG2, and PG3, the first and second clutches CL1 and CL2, and first, second, and third brakes BR1, BR2, and BR3.

The first, second, and third gear sets PG1, PG2, and PG3 are arranged on an axis of the input shaft 14 so as to be lined up in this order from the front side and constitute a power transmission path between the input shaft 14 and the counter drive gear 18. The gear sets PG1, PG2, and PG3 are arranged at the rear side of the counter drive gear 18.

The first and second clutches CL1 and CL2 are arranged at the front side of the counter drive gear 18 on the axis of the input shaft 14. The first and second clutches CL1 and CL2 are provided so as to overlap each other in the radial direction such that the first clutch CL1 is located outside the second clutch CL2. Each of the first and second clutches CL1 and CL2 serves as an input clutch configured to engage or disengage the input shaft 14 with or from the gear set PG1 or PG2.

The first, second, and third brakes BR1, BR2, and BR3 are arranged on the axis of the input shaft 14 so as to be lined up in this order from the front side. The brakes BR1, BR2, and BR3 are arranged at the rear side of the counter drive gear 18 in the axial direction and outside the first, second, and third gear sets PG1, PG2, and PG3 in the radial direction.

Supply and discharge of hydraulic pressure to and from the above-described friction engaging elements CL1, CL2, BR1, BR2, and BR3 are performed by controlling solenoid valves 150 and spool valves 160 by the electronic control unit 200. A gear stage corresponding to a shift range or a vehicle driving state is formed by selectively engaging the above friction engaging element.

The configuration of the transmission mechanism 30 explained above is just one example, and a specific configuration of the transmission mechanism 30 is not especially limited.

Valve Body

The valve body 100 of a hydraulic control device according to the present embodiment is accommodated in the transmission casing 2.

As shown in FIGS. 2 to 6, the valve body 100 includes a tubular portion 101 extending in the direction along the center axis of the transmission mechanism 30. The tubular portion 101 is arranged so as to surround the first to third the gear sets PG1, PG2, and PG3 and first to third brakes BR1, BR2, and BR3 of the transmission mechanism 30.

In the present embodiment, a front-side end portion of the tubular portion 101 of the valve body 100 is fixed to the wall portion 3a of the casing main body 3 of the transmission casing 2 by bolts 27.

The valve body 100 includes an annular vertical wall portion 104 extending from an inner peripheral surface of the front-side end portion of the tubular portion 101 inward in the radial direction, and a bearing 19 is fitted to an inner side of the vertical wall portion 104. With this, the counter drive gear 18 is rotatably supported by the transmission casing 2 through the bearing 19 and the valve body 100 formed by integrating an inner tubular portion 106, the vertical wall portion 104, and the tubular portion 101.

The plurality of solenoid valves 150 and the plurality of spool valves 160 are arranged adjacent to each other in the circumferential direction at the front side of the tubular portion 101 of the valve body 100. Therefore, valve insertion holes 120 to which the solenoid valves 150 are attached and valve insertion holes 120 (not shown) to which the spool valves 160 are attached are arranged at the tubular portion 101 along an inner circumference of the tubular portion 101 at intervals in the circumferential direction. Further, oil passages 110 communicating with the valve insertion holes 120 are provided at the tubular portion 101.

Directions along center axes of all the valve insertion holes 120 are parallel to the direction along the center axis of the transmission mechanism 30. Further, all the valve insertion holes 120 are open toward the front side in the axial direction. With this, when performing finishing processing with respect to inner peripheral surfaces of the valve insertion holes 120, the processing can be performed from the same direction with respect to all the valve insertion holes 120. In addition, when attaching the valves 150 and 160 to the valve insertion holes 120, all the valves 150 and 160 can be inserted from the same direction. It should be noted that the number of valve insertion holes 120 and the arrangement of the valve insertion holes 120 are optional.

Each of the solenoid valves 150 includes: a cylindrical electromagnetic portion 152 accommodating a coil; and a cylindrical small-diameter portion 154 smaller in diameter than the electromagnetic portion 152 and extending from the electromagnetic portion 152 in the axial direction. The solenoid valve 150 is assembled to the valve body 100 with the small-diameter portion 154 inserted into the valve insertion hole 120.

The solenoid valve 150 is arranged so as to project from the tubular portion 101 of the valve body 100 toward the front side. The electromagnetic portion 152 of the solenoid valve 150 is accommodated in an inner space of the casing main body 3, the inner space being located at the front side of the tubular portion 101. The electromagnetic portion 152 is arranged in the casing main body 3 so as to be located outside the counter drive gear 18 and the first and second clutches CL1 and CL2 in the radial direction without interfering with the counter drive gear 18 and the first and second clutches CL1 and CL2.

The solenoid valves 150 and the spool valves 160 constitute a hydraulic control circuit (not shown) together with the oil passages 110 of the valve body 100 and the like. By the operations of the solenoid valves 150 and the spool valves 160, the hydraulic control circuit controls the supply and discharge of oil to and from: hydraulic chambers and centrifugal balance chambers of the clutches CL1 and CL2 and brakes BR1, BR2, and BR3 constituting the transmission mechanism 30; portions to be lubricated in the transmission casing 2, such as gear meshing portions and bearing portions in the transmission mechanism 30; portions to be lubricated in the torque converter; a hydraulic chamber of a lock-up clutch (not shown); and the like.

A linear solenoid valve or an on/off solenoid valve is used as the solenoid valve 150. For example, the linear solenoid valve is used as a valve configured to directly control hydraulic pressure supplied to the hydraulic chamber of the friction engaging element CL1, CL2, BR1, BR2, or BR3, and the on/off solenoid valve is used as a valve configured to open and close a hydraulic pressure supply passage connected to a control port of the spool valve 160.

Method of Manufacturing Valve Body

The valve body 100 is formed by a three-dimensional lamination molding method using a 3D printer such that all portions except for hollow portions, such as the valve insertion holes 120 and the oil passages 110, 111, 112, 113, and 114, are integrally continuous.

A specific printing method in the three-dimensional lamination molding method is not especially limited. When using metal, such as aluminum, as a material of the valve body 100, for example, a powder sintering lamination molding method may be adopted, in which repeated is an operation of: irradiating an arbitrary position of a layer of spread metal powder with an electron beam or a laser to sinter and mold this irradiated portion; and spreading a next layer.

Also when using resin as the material of the valve body 100, the powder sintering lamination molding method may be adopted. However, when using a resin material, many printing methods are adoptable as compared to when using a metal material. Therefore, the printing methods, such as an ink-jet method, may be adopted according to need.

The molding of the valve body 100 by the three-dimensional lamination molding method is performed along a lamination direction that is an upward direction in such a posture that the center axes of the valve insertion holes 120 and the center axis of the tubular portion 101 extend along an upward/downward direction. Further, the direction of the valve body 100 at this time is set to such a direction that, for example, the valve insertion hole 120 is open downward, and a piston cylinder 108 is open upward.

The valve insertion holes 120 to which the valves 150 and 160 are attached are formed by: forming prepared holes when molding the valve body 100 by the three-dimensional lamination molding method; and then subjecting inner peripheral surfaces of the prepared holes to finishing processing. However, without forming the prepared holes on the valve body 100 when molding the valve body 100 by the three-dimensional lamination molding method, the valve insertion holes 120 may be formed only by machine work performed after the molding.

Electronic Control Unit

As shown in FIG. 1, the electronic control unit 200 formed in a circular-arc shape extending in a circumferential direction about the center axis of the transmission mechanism 30 as a whole is arranged so as to surround the transmission mechanism 30. Further, as shown in FIG. 2, the electronic control unit 200 is arranged adjacent to the solenoid valves 150 in an accommodating space S located at the front side of the vertical wall portion 104 (valve body 100) in the axial direction.

The electronic control unit 200 includes a main body portion 201 and a connector 202. The main body portion 201 includes an inner peripheral surface extending in the circumferential direction along an outer peripheral surface of the transmission mechanism 30, in the present embodiment, along an outer peripheral surface of a clutch drum 31 of the first clutch CL1 located at the front side of the vertical wall portion 104 in the axial direction. The connector 202 extends from a middle of an outer peripheral surface 201f of the main body portion 201 outward in the radial direction.

The main body portion 201 includes an electronic circuit substrate (not shown) configured to control a gear shift operation of the automatic transmission 1. A microcomputer including at least electronic parts, such as a CPU, a ROM, and a RAM, is mounted on the electronic circuit substrate. The electronic circuit substrate is formed by resin mold integrally with rotational frequency sensors 203 and 204 electrically connected to the electronic circuit substrate. Used as a resin material for the resin mold is resin, such as epoxy resin, having an insulation property and oil resistance to high-temperature operating oil.

As shown in FIGS. 6 and 7, the main body portion 201 includes a flange portion 201a located at the rear side of the main body portion 201 and extending inward in the radial direction. A detecting portion of the first rotational frequency sensor 203 configured to detect an input rotational frequency of the transmission mechanism 30 is provided at a middle of an inner peripheral surface 201b of the main body portion 201 so as to project inward in the radial direction, and a detecting portion of the second rotational frequency sensor 204 configured to detect an output rotational frequency of the transmission mechanism 30 is provided at a middle of an inner peripheral surface 201c of the flange portion 201a of the main body portion 201 so as to project inward in the radial direction.

Each of the rotational frequency sensors 203 and 204 is an electromagnetic pickup sensor including a hall element configured to detect a rotational speed, a rotation angle, or the like of a measured object by detecting magnetic flux which changes in accordance with the rotation of the measured object. As shown in FIG. 5, the first rotational frequency sensor 203 is arranged such that the detecting portion thereof faces an outer peripheral surface of the clutch drum 31 with a gap so as to detect the rotational frequency of the clutch drum 31 of the first clutch CL1. Further, the second rotational frequency sensor 204 faces a tooth surface of the counter drive gear 18 with a gap so as to detect the rotational frequency of the counter drive gear 18.

As shown in FIG. 5, the main body portion 201 is configured to receive, for example, a signal from an oil temperature sensor 205 configured to detect a temperature of operating oil flowing in the valve body 100 and a signal from a shift position sensor (not shown) configured to detect a shift position (range) selected by a select lever (not shown).

A plurality of insertion holes 201e are formed at a rear-side end surface 201d of the main body portion 201 at intervals in the circumferential direction. The electromagnetic portions 152 of the solenoid valves 150 can be inserted into the respective insertion holes 201e from the rear side in the axial direction. The insertion hole 201e is configured such that when the electromagnetic portion 152 of the solenoid valve 150 is inserted into the insertion hole 201e, the electromagnetic portion 152 is electrically connected to the incorporated electronic circuit substrate. With this, gear change control by the plurality of solenoid valves 150 can be performed.

As shown in FIG. 5, the electronic control unit 200 is arranged such that the connector 202 to be electrically connected to a device outside the automatic transmission 1 for the supply of electric power and the transmission and reception of signals penetrates the transmission casing 2 outward in the radial direction.

When assembling the electronic control unit 200 having the above configuration to the transmission casing 2, the solenoid valves 150 are inserted into and connected to the respective insertion holes 201e of the main body portion 201 in advance. In this state, while inclining the electronic control unit 200 and fitting the connector 202 into an insertion hole of the transmission casing 2, the small-diameter portions 154 of the solenoid valves 150 are inserted into the respective valve insertion holes 120 formed for the solenoid valves 150. Thus, the main body portion 201 is assembled to the transmission casing.

Embodiment 2

An automatic transmission according to Embodiment 2 will be explained with reference to FIGS. 8 to 14. In Embodiment 2, the same reference signs are used for the same components as in Embodiment 1, and explanations thereof are omitted.

Figure 8:
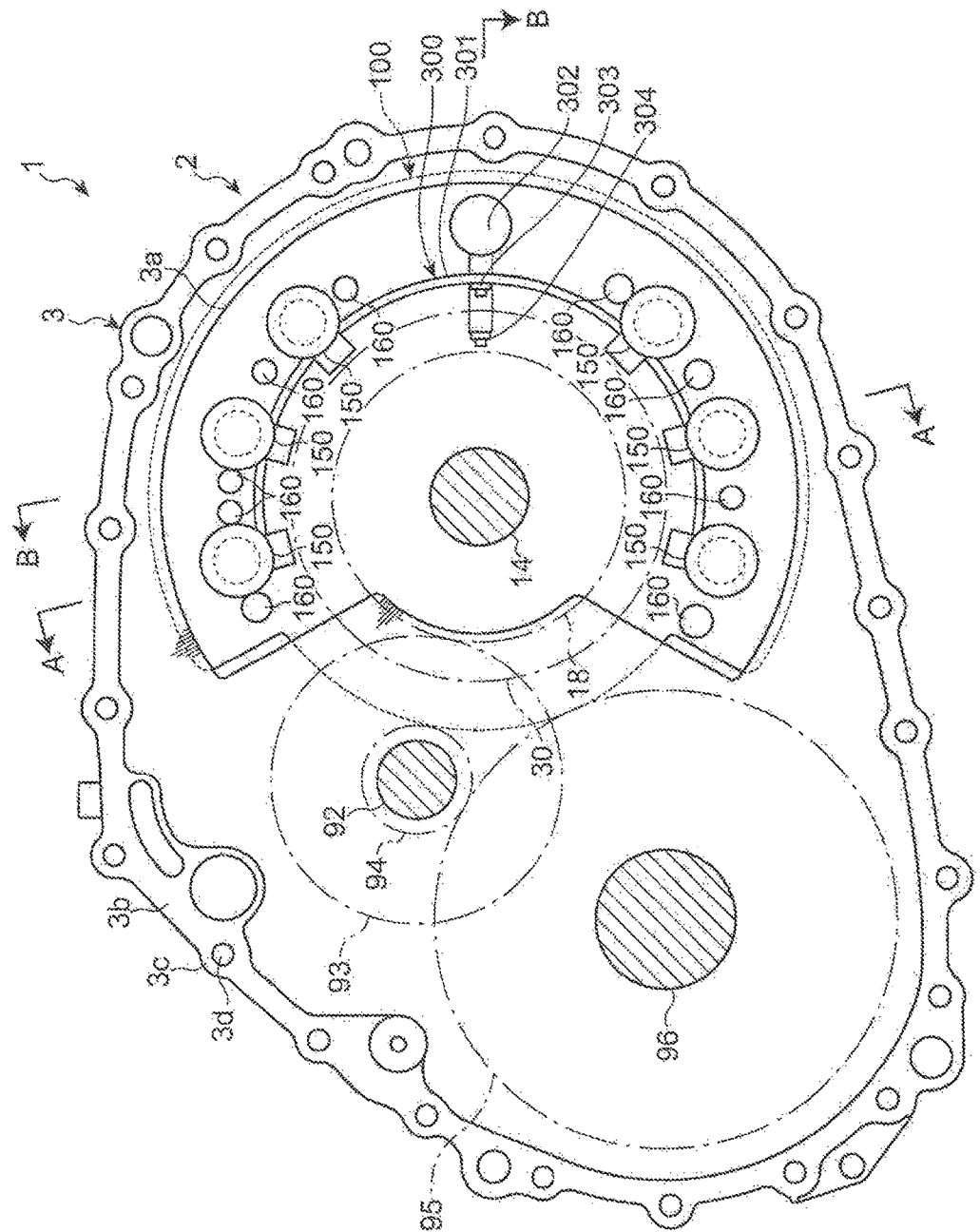
FIG. 8 is a diagram when viewing the schematic internal structure of the automatic transmission according to Embodiment 2 of the present invention from the driving source side in the axial direction.
Figure 9:
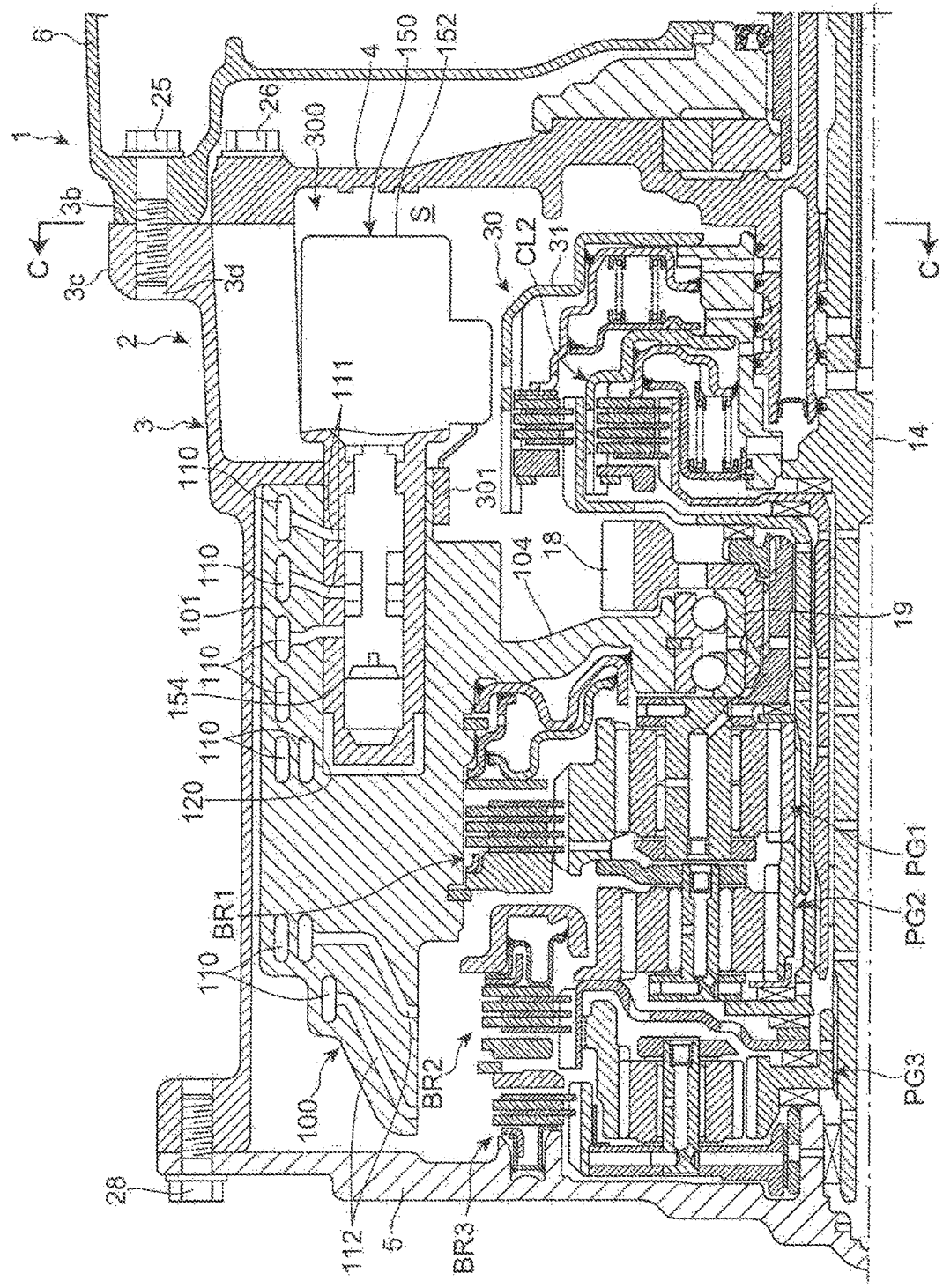
FIG. 9 is a sectional view taken along line A-A of FIG. 2 and shows the upper-half portion of the internal structure of the automatic transmission.
Figure 10:
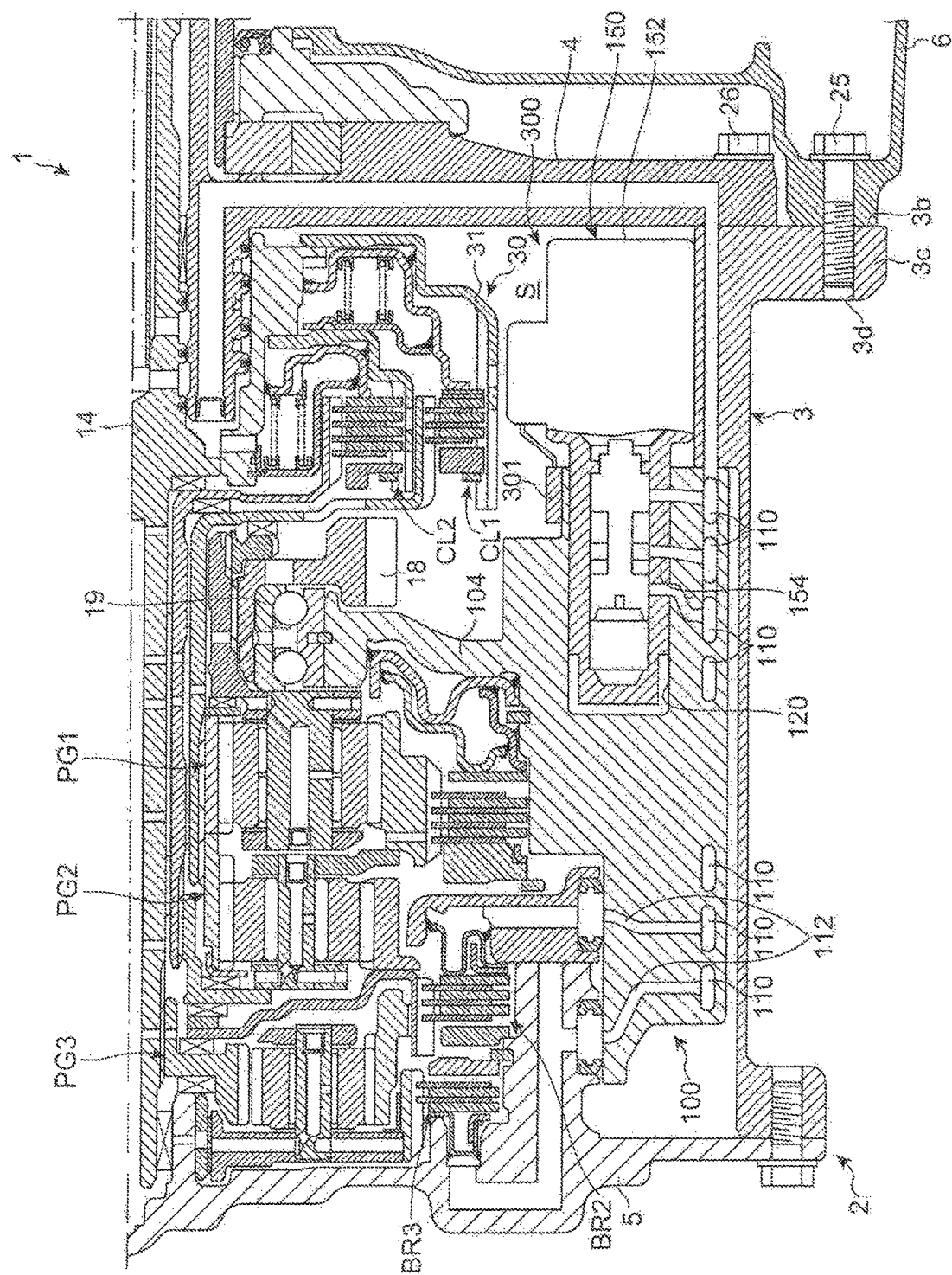
FIG. 10 is a sectional view taken along line A-A of FIG. 2 and shows the lower-half portion of the internal structure of the automatic transmission.
Figure 11:
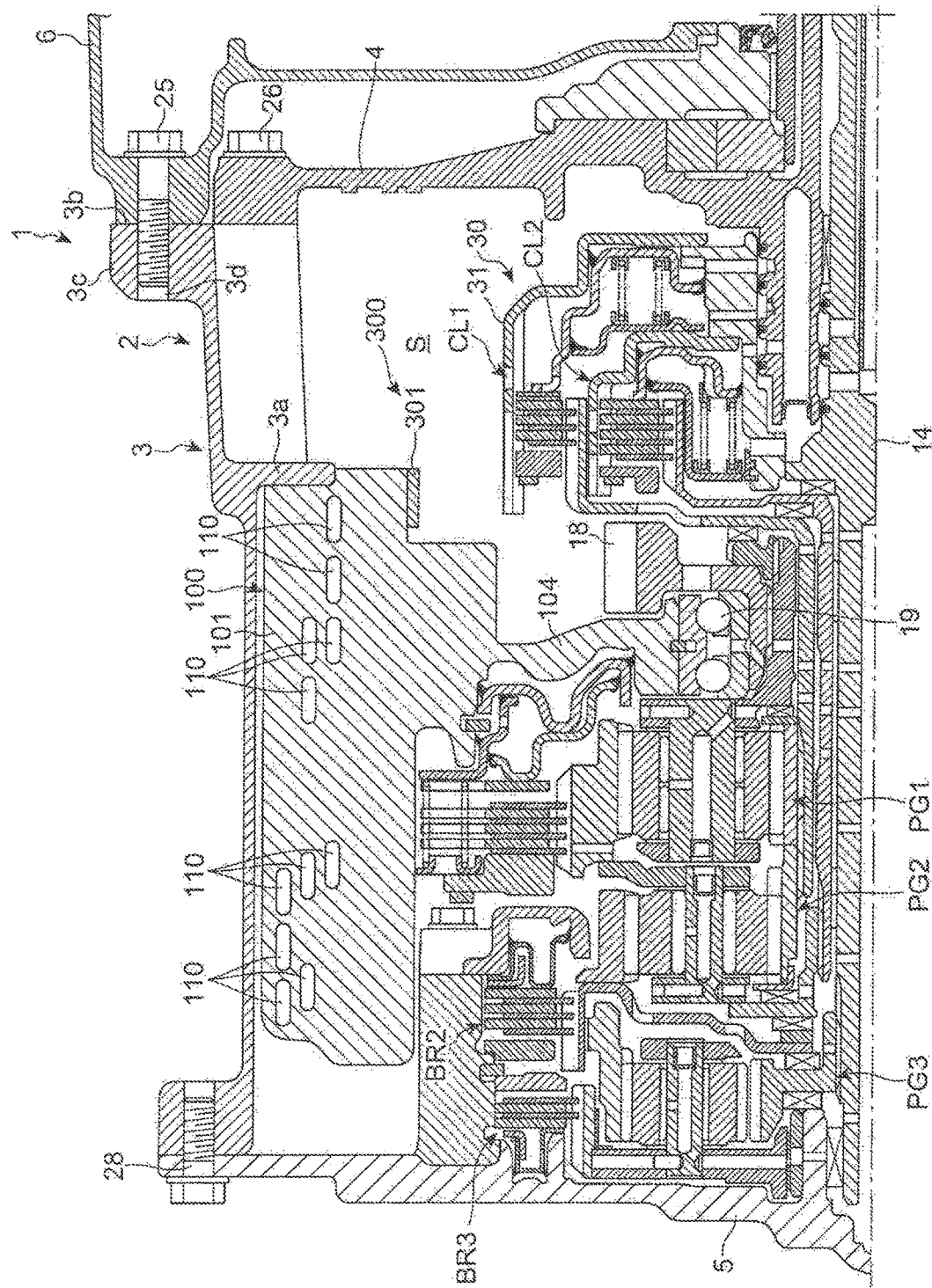
FIG. 11 is a sectional view taken along line B-B of FIG. 2 and shows the upper-half portion of the internal structure of the automatic transmission.

As shown in FIG. 8, as with Embodiment 1, an electronic control unit 300 of Embodiment 2 is also formed in a circular-arc shape extending in the circumferential direction about the center axis of the transmission mechanism 30 as a whole, and a main body portion 301 of the electronic control unit 300 extends in the circumferential direction along the outer peripheral surface of the clutch drum 31 of the first clutch CL1 and is arranged adjacent to the solenoid valves 150 in the accommodating space S located at the front side of the vertical wall portion 104 (valve body 100) in the axial direction. However, the shape of the main body portion 301, a direction in which the solenoid valve 150 is connected to the main body portion 301, and a direction of a connector 302 with respect to the main body portion 301 are different from those of Embodiment 1.

As shown in FIGS. 13 and 14, the main body portion 301 having a circular-arc shape has a shape obtained by bending a flat plate having a substantially uniform thickness into a circular-arc shape, and a height of the main body portion 301 in the axial direction and a thickness of the main body portion 301 in the radial direction are smaller than those of Embodiment 1.

The main body portion 301 is configured such that the plurality of solenoid valves 150 can be arranged on an outer peripheral surface 301b of the main body portion 301 at intervals in the circumferential direction so as to be parallel to one another along the axial direction. By bringing the electromagnetic portion 152 of the solenoid valve 150 into contact with the main body portion 301 from the front side in the axial direction, the solenoid valve 150 and the incorporated electronic circuit substrate are electrically connected to each other. With this, the gear change control by the plurality of solenoid valves 150 can be performed.

Figure 12:
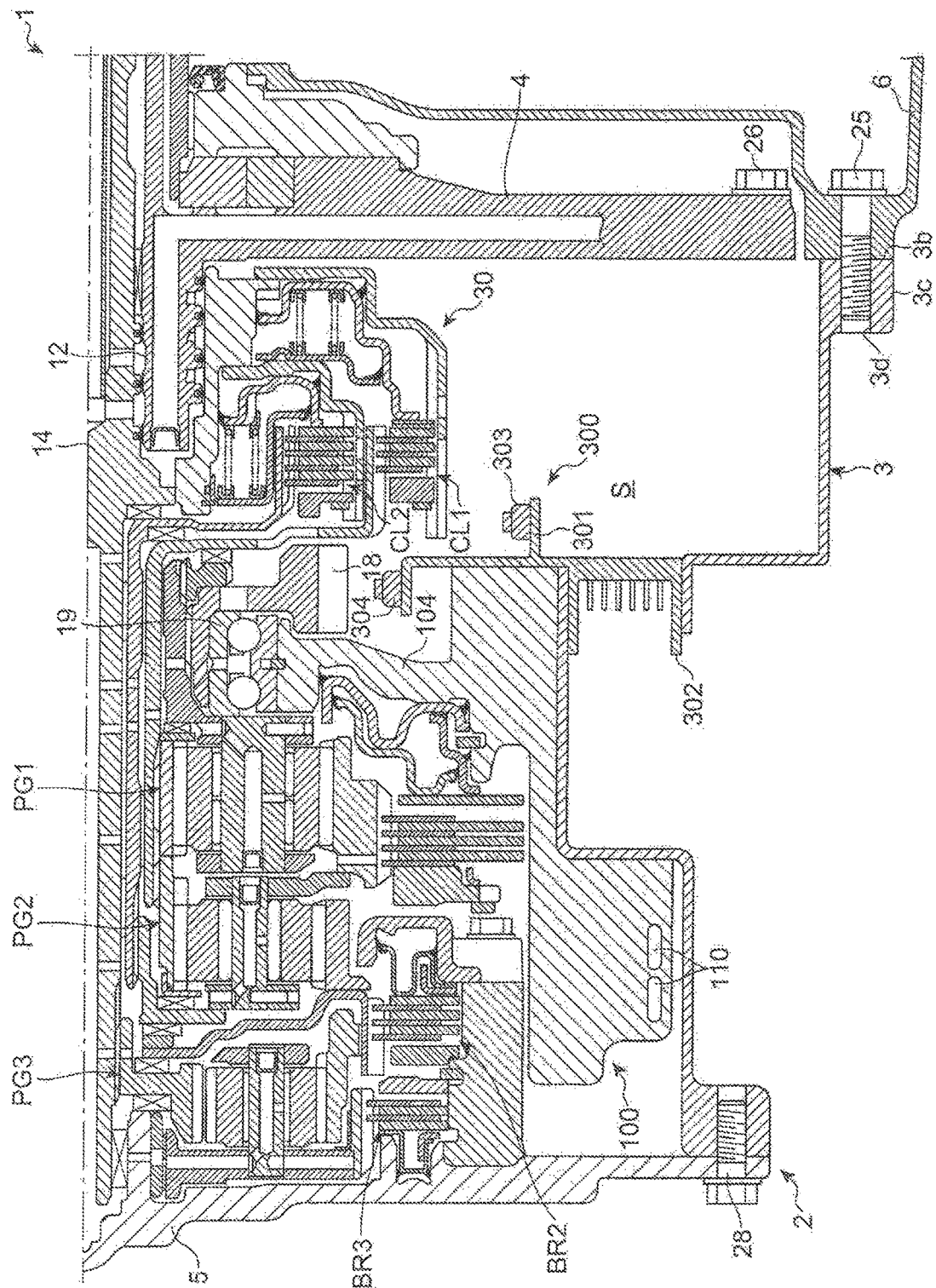
FIG. 12 is a sectional view taken along line B-B of FIG. 2 and shows the lower-half portion of the internal structure of the automatic transmission.

The connector 302 to be electrically connected to a device outside the automatic transmission 1 is provided integrally at the rear side of a middle of the outer peripheral surface 301b of the main body portion 301 in the axial direction. As shown in FIG. 12, when the electronic control unit 300 is assembled in the transmission casing 2, the connector 302 is arranged so as to penetrate the transmission casing 2 toward the rear side in the axial direction.

As with Embodiment 1, the electronic circuit substrate of the main body portion 301 is formed by resin mold integrally with rotational frequency sensors 303 and 304. A detecting portion of the first rotational frequency sensor 303 configured to detect the input rotational frequency of the transmission mechanism 30 is provided integrally at the electronic control unit 300 so as to project from a middle of an inner peripheral surface 301a of the main body portion 301 inward in the radial direction. The electronic control unit 300 includes a sensor supporting portion 305 extending from a middle of an axially rear-side end portion of the main body portion 301 inward in the radial direction, and the second rotational frequency sensor 304 configured to detect the output rotational frequency of the transmission mechanism 30 is provided integrally at a tip end of the sensor supporting portion 305.

When assembling the electronic control unit 300 having the above configuration to the transmission casing 2, first, the electronic control unit 300 is inserted into and assembled to the transmission casing 2 from the front side in the axial direction. Next, the plurality of solenoid valves 150 are inserted into the respective valve insertion holes 120 of the valve body 100 and electrically connected to the electronic control unit 300, the valve insertion holes 120 being open at the outer peripheral surface side of the electronic control unit 300.

According to the electronic control unit 300, since a height of the main body portion 301 in the axial direction and a thickness of the main body portion 301 in the radial direction are made small, the automatic transmission 1 can be downsized more effectively. Further, without inclining the electronic control unit 300, the electronic control unit 300 can be attached to the transmission casing 2 only by being inserted into the transmission casing 2 in the axial direction. Then, the solenoid valves 150 can be connected to the electronic control unit 300 from the front side in the axial direction. Therefore, the automatic transmission 1 is assembled more easily than Embodiment 1 in which the electronic control unit 200 into which the solenoid valves 150 are inserted in advance are assembled to the transmission casing 2 while being inclined.

As above, according to the above embodiment, the electronic control unit 200 (300) is formed such that the inner peripheral surface of the electronic control unit 200 (300) extends in the circumferential direction along the outer peripheral surface of the transmission mechanism 30. Therefore, as compared to the conventional automatic transmission 1 in which the electronic control unit 200 (300) having a box-shaped outer shape is arranged outside the transmission mechanism 30 having a cylindrical outer shape, the entire automatic transmission 1 can be compactly configured in the radial direction, and with this, the mountability of the automatic transmission 1 onto the vehicle improves.

According to the above embodiment, the valve body 100 is configured such that an inner peripheral surface of the valve body 100 extends in the circumferential direction along the outer peripheral surface of the transmission mechanism 30. Therefore, as compared to the conventional automatic transmission 1 in which the valve body 100 and the electronic control unit 200 (300) each having a box-shaped outer shape are arranged outside the transmission mechanism 30 having a cylindrical outer shape, the entire automatic transmission 1 can be compactly configured in the radial direction, and with this, the mountability of the automatic transmission 1 onto the vehicle further improves.

According to the above embodiment, the plurality of solenoid valves 150 are provided at one axial end of the valve body 100 so as to be lined up in the circumferential direction, and the electronic control unit 200 (300) is arranged adjacent to the solenoid valves 150. Therefore, the plurality of solenoid valves 150 can be easily connected to the electronic control unit 200 (300) without through a cable.

According to the above embodiment, the rotational frequency sensors 203 and 204 (303 and 304) each configured to detect the rotational frequency of the rotational element are formed integrally with the electronic control unit 200 (300). Therefore, as compared to the conventional automatic transmission 1 in which the rotational frequency sensors 203 and 204 (303 and 304) are formed separately from the electronic control unit 200 (300), the electronic control unit 200 (300) including the rotational frequency sensors 203 and 204 (303 and 304) can be easily attached in the transmission casing 2.

According to the above embodiment, the electronic control unit 200 (300) is arranged in the accommodating space S located at the front side of the vertical wall portion 104 in the transmission casing 2 in the axial direction. Therefore, the electronic control unit 200 (300) can be accommodated while effectively utilizing the space in the transmission casing 2.

According to the above embodiment, the first rotational frequency sensor 203 (303) configured to detect the rotational frequency of the clutch drum 31 of the first clutch CL1 arranged in the accommodating space S located at the front side of the vertical wall portion 104 in the axial direction is included. Therefore, as compared to the conventional automatic transmission in which the rotational frequency sensor is formed separately from the electronic control unit, the electronic control unit 200 (300) including the first rotational frequency sensor 203 (303) can be easily attached in the transmission casing 2.

According to the above embodiment, as the rotational frequency sensor (203, 204, 303, 304), the second rotational frequency sensor 204 (304) configured to detect the rotational frequency of the counter drive gear 18 supported by the vertical wall portion 104 is included. Therefore, as compared to the conventional automatic transmission 1 in which the rotational frequency sensor is formed separately from the electronic control unit, the electronic control unit 200 (300) including the second rotational frequency sensor 204 (304) can be easily attached in the transmission casing 2.

Further, according to the method of manufacturing the automatic transmission 1 of the present embodiment, the valve body 100 including the inner peripheral surface extending in the circumferential direction along the outer peripheral surface of the transmission mechanism 30 can be manufactured by the three-dimensional lamination molding method. Therefore, as compared to the conventional automatic transmission in which the electronic control unit and the valve body each having a box-shaped outer shape are arranged outside the transmission mechanism having a cylindrical outer shape, the entire automatic transmission 1 to which the valve body 100 is assembled can be configured compactly in the radial direction, and as a result, the mountability of the automatic transmission 1 onto the vehicle improves.

Further, since the valve body 100 is molded by the three-dimensional lamination molding method, it is unnecessary to consider separating the valve body from a die. Therefore, when designing the oil passages of the valve body 100, there is no conventional restriction, such as a restriction in which all the oil passages need to be open on a contact surface over the entire length. Therefore, a high degree of freedom of the shapes and layout of the oil passages can be obtained, and with this, the degree of freedom of the shape of the valve body 100 and the degree of freedom of the layout in the transmission casing 2 are also made high.

The forgoing has explained the present invention based on the above embodiments. However, the present invention is not limited to the above embodiments.

The above embodiment has explained an example in which the electronic control unit is continuously formed at a part of a circumferential range of the transmission mechanism. However, in the present invention, the electronic control unit may be formed in a completely tubular shape surrounding the entire periphery of the transmission mechanism.

The above embodiment has explained the automatic transmission 1 in which the inner peripheral surface of the electronic control unit 200 (300) is formed so as to extend in the circumferential direction along the outer peripheral surface of the first clutch CL1. However, the above embodiment is not limited to this. For example, the inner peripheral surface of the electronic control unit may be formed so as to extend in the circumferential direction along an outer peripheral surface of a different mechanism constituting the transmission mechanism 30, for example, along an outer peripheral surface of the first, second, or third gear set PG1, PG2, or PG3, the second clutch CL2, or the first, second, or third brake BR1, BR2, or BR.

The above embodiment has explained the automatic transmission 1 in which the valve body 100 is formed separately from the transmission casing 2. However, in the present invention, the valve body may be formed integrally with the transmission casing. With this, the number of parts of the automatic transmission and the number of steps of assembling the automatic transmission can be reduced.

Further, the above embodiment has explained the planetary gear type automatic transmission 1. However, the above embodiment is not limited to this. For example, the present invention is applicable to automatic transmissions (a CVT, an AMT, and the like) other than the planetary gear type automatic transmission.

INDUSTRIAL APPLICABILITY

As above, according to the present invention, the automatic transmission including the electronic control unit can be downsized. Therefore, the present invention may be suitably utilized in an industrial field of manufacture of this type of automatic transmission and a vehicle including such automatic transmission.

LIST OF REFERENCE CHARACTERS 1 automatic transmission
2 transmission casing
18 counter drive gear (output member)
30 transmission mechanism
31 clutch drum (input-side rotational element)
100 valve body (hydraulic control mechanism)
104 vertical wall portion (intermediate wall)
150 solenoid valve (hydraulic solenoid valve)
200 electronic control unit
203 first rotational frequency sensor (rotational frequency detecting portion)
204 second rotational frequency sensor (rotational frequency detecting portion)
300 electronic control unit
303 first rotational frequency sensor (rotational frequency detecting portion)
304 second rotational frequency sensor (rotational frequency detecting portion)
CL1 first clutch (input clutch)
S accommodating space

The invention claimed is:

1. An automatic transmission comprising:
a transmission mechanism including a rotational element;
a hydraulic control mechanism configured to control the transmission mechanism;
an electronic control unit configured to perform electronic control of the hydraulic control mechanism; and
a transmission casing in which the transmission mechanism, the hydraulic control mechanism, and the electronic control unit are arranged, wherein
the electronic control unit is formed such that an inner peripheral surface of the electronic control unit extends in a circumferential direction along an outer peripheral surface of the transmission mechanism.

2. The automatic transmission according to claim 1, wherein the hydraulic control mechanism is formed such that an inner peripheral surface of the hydraulic control mechanism extends in the circumferential direction along the outer peripheral surface of the transmission mechanism.

3. The automatic transmission according to claim 2, wherein:
a plurality of hydraulic solenoid valves are provided at one axial end of the hydraulic control mechanism so as to be lined up in the circumferential direction; and
the electronic control unit is arranged adjacent to the hydraulic solenoid valves.

4. The automatic transmission according to claim 3, wherein the hydraulic control mechanism is formed integrally with the transmission casing.

5. The automatic transmission according to claim 3, wherein a rotational frequency detecting portion configured to detect a rotational frequency of the rotational element is formed integrally with the electronic control unit.

6. The automatic transmission according to claim 2, wherein the hydraulic control mechanism is formed integrally with the transmission casing.

7. The automatic transmission according to claim 6, wherein a rotational frequency detecting portion configured to detect a rotational frequency of the rotational element is formed integrally with the electronic control unit.

8. The automatic transmission according to claim 2, wherein a rotational frequency detecting portion configured to detect a rotational frequency of the rotational element is formed integrally with the electronic control unit.

9. The automatic transmission according to claim 1, wherein a rotational frequency detecting portion configured to detect a rotational frequency of the rotational element is formed integrally with the electronic control unit.

10. The automatic transmission according to claim 9, wherein:
the transmission casing includes an intermediate wall; and
the electronic control unit is arranged in an accommodating space located at a first axial side of the intermediate wall.

11. The automatic transmission according to claim 10, wherein:
an input clutch of the transmission mechanism is arranged in the accommodating space; and
the rotational frequency detecting portion includes a sensor configured to detect a rotational frequency of an input-side rotational element of the input clutch.

12. The automatic transmission according to claim 11, wherein:
the rotational element includes an output member supported by the intermediate wall; and
the rotational frequency detecting portion includes a sensor configured to detect a rotational frequency of the output member.

13. The automatic transmission according to claim 10, wherein:
the rotational element includes an output member supported by the intermediate wall; and
the rotational frequency detecting portion includes a sensor configured to detect a rotational frequency of the output member.

14. A method of manufacturing an automatic transmission,
the automatic transmission comprising:
a transmission mechanism including a rotational element;
a hydraulic control mechanism configured to control the transmission mechanism;
an electronic control unit configured to perform electronic control of the hydraulic control mechanism; and
a transmission casing in which the transmission mechanism, the hydraulic control mechanism, and the electronic control unit are arranged, wherein
the electronic control unit is formed such that an inner peripheral surface of the electronic control unit extends in a circumferential direction along an outer peripheral surface of the transmission mechanism,
the method comprising
molding the hydraulic control mechanism by a three-dimensional lamination molding method such that an inner peripheral surface of the hydraulic control mechanism extends in the circumferential direction along the outer peripheral surface of the transmission mechanism.

* * * * *